United States Patent Office 2,874,153
Patented Feb. 17, 1959

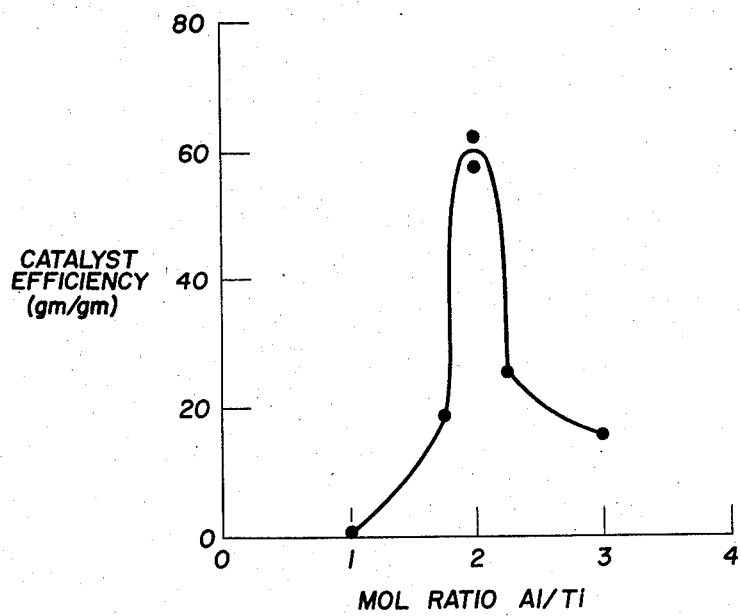

2,874,153

POLYMERIZATION OF PROPYLENE

Lewis W. Bowman, Westfield, and Robert F. Leary, Cranford, N. J., assignors to Esso Research and Engineering Company, a corporation of Delaware Application October 28, 1955, Serial No. 543,470

10 Claims. (Cl. 260—93.7)

This invention relates to polymerization and more particularly relates to an improved process for polymerizing propylene at substantially atmospheric pressure.

Propylene has been polymerized in the past to relatively low molecular weight polymers by the use of such catalysts as phosphoric acid on kieselguhr. Attempts have been made in the prior art to produce relatively high molecular weight polypropylenes. However, such processes have been generally unsuccessful, particularly from a commercial standpoint, as they have failed to produce the desired high molecular weight polymers, have necessitated the use of very high pressures and/or have resulted in extremely low polymer yields. There has thus been a long-felt need for a simple, inexpensive and effective method for polymerizing propylene to high molecular weight polymers, as such polymers are potentially useful in the manufacture of plastics, molded articles and as lubricating additives and film-forming materials.

An improved method has now been found for effectively and economically polymerizing propylene to high molecular weight polymers. More particularly, the present invention comprises polymerizing propylene at substantially atmospheric pressure in the presence of a catalyst obtained by mixing aluminum trialkyl with a reducible compound of titanium wherein the molar (or atomic) ratio of aluminum to the titanium in the catalyst is greater than about 1:1 but less than about 5:1. Generally the polymerization reaction is carried out in the presence of an inert liquid diluent to thereby provide efficient contact between the propylene and the catalyst.

The aluminum trialkyls employed in the present invention have the general formula $$AlR_3$$

where R is an alkyl radical, the preferred aluminum trialkyls being those wherein R contains 2 to 4 carbon atoms. It will be understood that the R groups in a given compound may be different alkyl radicals. Examples of aluminum trialkyls useful in the present invention include triethyl aluminum, tripropyl aluminum, tributyl aluminum, diethyl butyl aluminum, dibutyl ethyl aluminum, ethyl propyl butyl aluminum, and dibutyl propyl aluminum. The preferred aluminum alkyl is aluminum triethyl because this particular aluminum trialkyl can be prepared simply and inexpensively and also because it is a particularly efficient catalyst component for the purposes of the present invention. The reducible compound of titanium is preferably titanium tetrachloride ($TiCl_4$).

It has been found that the mol ratio of the aluminum compound to the titanium compound in the catalyst mixture is particularly critical for the purposes of the present invention; i. e., it is possible at only certain critical ratios of aluminum to titanium to obtain high yields of high molecular weight polypropylenes, based on amount of catalyst employed. More particularly, it is necessary that the molar ratio of aluminum to titanium in the catalyst be greater than about 1:1 and more particularly at least about 1.5:1. It has also been found that the aluminum to titanium molar ratio should be less than about 4:1 and more particularly not more than about 3:1. Generally, it is preferred to employ the two catalyst components in proportions of about 1.75:1 to 2.5:1 (molar ratio of aluminum to titanium). More preferably the aluminum to titanium ratio (Al/Ti) is maintained in the range of about 1.75:1 to 2.25:1. Particularly efficient results have been attained using a mol ratio of aluminum to titanium of about 2:1. The attached drawing illustrates the criticality of the aluminum to titanium ratio in the present invention so as to obtain high product yields.

The catalyst of the present invention is obtained simply by mixing the aluminum compound with the titanium compound in the presence of a diluent. Generally, it will be desirable to employ the same diluent in the catalyst preparation step as is employed in the polymerization reaction. It is of course essential that the diluent be essentially inert in the polymerization process and it is also necessary that the diluent be liquid at the polymerization reaction conditions. Preferred inert diluents are the normally-liquid saturated hydrocarbons such as for example $C_5$ to $C_{20}$ saturated aliphatic hydrocarbons. Examples of such diluents which are useful in the present invention are pentane, hexane, heptane, octane and decane; n-heptane is particularly preferred. The two catalyst components, that is the aluminum trialkyl and the titanium tetrachloride are intimately mixed together in the presence of the inert liquid diluent. Generally, it will be desirable to thoroughly mix together the two components for about 0.1 to 1 hour. The catalyst preparation step may be carried out conveniently at room temperature although temperatures generally in the range of about 0 to 50° C. may be used. Generally, the concentration of the catalyst compounds in the inert liquid diluent during the catalyst preparation step will be maintained in a range of about 10 to 120, preferably about 20 to 40 grams/liter. The mixing of the two catalyst components generally forms a finely divided precipitate (or slurry) in the inert liquid diluent.

It is important to employ a propylene stream which is essentially free from materials which will poison the polymerization catalyst. Such poisons include water, oxygen, acetylenes, carbon monoxide, carbon dioxide and hydrogen sulfide. Commercial propylenes may be purified, for example, by scrubbing them with an aluminum trialkyl, such as those described above. It will be understood that it is not necessary to employ a feed which consists entirely of propylene. For example, a feed consisting essentially of propylene and propane may be employed. In other words, the propylene stream may contain inert gaseous components such as low boiling saturated hydrocarbons but should not contain poisons such as those mentioned above, or unsaturates other than propylene.

One of the features of the present invention is that the polymerization of propylene may be carried out at substantially atmospheric pressure. This process thus has a number of advantages over high pressure polymerization processes, namely (1) lower cost for the polymerization equipment, (2) greater safety in operation and (3) more ready adaptability to a continuous process.

The polymerization reaction temperatures should be maintained generally in the range of about 40° to 120° C., preferably about 50° to 100° C. Generally the polymerization times employed will be about 0.1 to about 100 hours, although usually about 0.5 to 10 hours will be employed. The amount of catalyst employed in the polymerization reaction will be generally about .01 to 1.0% or higher, preferably about 0.1 to 0.5%, by weight based on the weight of solvent in the polymerization reactor. Using such catalyst concentrations, the yield of polypropylene will generally be about 1 to 20%, usually about 10 to 15% by weight based on the total reaction mixture (including the inert liquid diluent). It is desirable to maintain the final polypropylene content of the reaction mixture in these ranges as higher concentrations tend to foul up the polymerization reaction and lower concentrations are less efficient and uneconomical. The inert liquid diluent employed in the polymerization process is preferably of the type described above as being useful in the catalyst preparation step. Generally it is preferred to agitate the polymerization mixture during the course of the reaction to promote an efficient contacting between the catalyst and the propylene. Good polymerization results are obtained when the catalyst slurry and inert liquid diluent are heated to about 50° to 100° C. prior to the introduction of the propylene to the polymerization zone. The propylene can generally be bubbled into the polymerization zone containing the catalyst and inert liquid diluent. The polymerization will be discontinued after the absorption of propylene has substantially decreased or ceased. The process may be carried out on a batch or continuous basis.

It has also been found that the highest polymerization rates can be obtained by adding the aluminum compound incrementally during the polymerization reaction. More specifically, the aluminum compound may be added in two or more portions during the polymerization reaction. Generally the portion/portions added after the polymerization reaction has been initiated are added when the conversion rate of propylene to polypropylene has substantially decreased (or has ceased). By incremental addition of the aluminum compound it has been found that the polymerization rate can be approximately doubled over the rate obtained with non-incremental addition. In a preferred embodiment of the invention the polymerization is initiated using a molar ratio of aluminum to titanium of at least about 0.5:1, preferably at least about 1:1, and the remainder of the catalysts is added in essentially equal portions during the polymerization reaction.

The polypropylenes produced in accordance with the present invention have intrinsic viscosities generally in the range of about 0.2 to 6.0, usually about 0.50 to 2.20. These intrinsic viscosities correspond to molecular weights in the range of about 5,000 to 400,000, usually about 10,000 to 100,000. The molecular weights referred to herein are number average, and assume the relation of intrinsic viscosity to molecular weight to be that given by Harris, J. Poly. Sci. 8, 361 (1952). Generally a portion of the polypropylene product will be soluble in paraffinic hydrocarbon oils (e. g., hexane, heptane) while another portion will be insoluble therein at temperatures of about 60–70° C. It has been found by X-ray analysis that the oil-soluble polymer is essentially amorphous in nature, whereas the oil-insoluble polymer is essentially crystalline in nature.

When the polymerization reaction is completed the polymer reaction mixture is preferably quenched to deactivate the polymerization catalyst. Quenching agents which may be employed include alcohols, acetone, etc. Preferred quenching agents are saturated aliphatic hydrocarbon alcohols having about 3 to 6 carbon atoms per molecule, such as isopropyl alcohol and butyl alcohol. Generally about 5 to 30 weight percent, preferably about 10 to 20 weight percent of the quenching agent will be employed based upon inert diluent. These quenching agents solubilize the catalyst and thus render it inactive.

The polypropylene may be recovered by a number of different methods. For example, the oil-insoluble polymer may be separated from the quenched reaction mixture by filtration. The filtrate may then be washed with an acidic aqueous solution to remove the catalyst residue therefrom, and the hydrocarbon diluent and quenching agent may be removed by distillation to thereby recover the oil-soluble portion of the polypropylene product. The polypropylene product may then be washed using acetone or an aliphatic alcohol, and the washed polypropylene may then be dried by heating in a vacuum oven to 40–60° C. Other methods of recovering the polypropylene product include discharging the hydrocarbon slurry-solution from the reactor into one of the previously mentioned aliphatic alcohols. The polymer is precipitated and filtration affords a mixture of solid amorphous and crystalline polypropylene. Washing and drying are carried out as before.

The invention will be more fully understood by reference to the following examples. It is pointed out however that the examples are given for the purpose of illustration only and are not to be construed as limiting the scope of the present invention in any way.

*Example I.—Preparation of polypropylene*
*(Al/Ti=about 2:1)*

The polymerization catalyst was prepared by mixing 1.6 grams of titanium tetrachloride with 1.0 gram of aluminum triethyl in 100 cc. of n-heptane. After standing about 25 minutes at about 25° C. the resultant composition was added to 400 cc. of n-heptane. Then gaseous propylene (which had previously been scrubbed with an oil solution of an aluminum alkyl) was bubbled through the slurry of catalyst in n-heptane at atmospheric pressure and room temperature until the mixture no longer absorbed propylene. This required about 1 hour. The temperature was then raised to 75° C. and 0.5 gram of aluminum triethyl was added to the reaction mixture, the temperature being maintained in the range of about 70–82° C. When propylene was no longer absorbed (after about 2.8 additional hours) another 0.5 gram of aluminum triethyl was added. After no more propylene was absorbed (after about 3.3 additional hours) the mixture was quenched with 100 cc. of isopropyl alcohol. The quenched reaction mixture was then filtered yielding 87.0 grams of solid polymer. The filtrate was then washed with about 300 cc. of aqueous hydrochloric acid to remove the catalyst residue and the filtrate was evaporated to yield 120 grams of solid polymer. X-ray examination of the two portions of the polymer showed the first (heptane-insoluble) portion to be highly crystalline while the second (heptane-soluble) portion was essentially amorphous. The total catalyst efficiency in this experiment was equivalent to a yield of 57.6 grams of polymer per gram of catalyst.

*Example II.—Preparation of polypropylene*
*(Al/Ti=about 1.75:1)*

The polymerization catalyst was prepared by mixing 1.6 grams of titanium tetrachloride with 1.75 grams of aluminum triethyl and 130 cc. of n-heptane. After standing for 25 minutes at about 24° C. the resultant composition was added to 400 cc. of n-heptane. Purified propylene (described in Example I) was passed at atmospheric pressure through the slurry of catalyst in n-heptane and the reaction temperature rose spontaneously from 24° to 49° C. The mixture was then heated to 80° C. and then cooled to 46° C. during which time propylene was passed through the reaction mixture. When essentially no more propylene was absorbed (after about 3.5 hours) the reaction mixture was worked up as described in Example I to yield 35 grams of solid polymer filtered from the reaction mixture and 31 grams of polymer from the reaction solvent. The catalyst efficiency in this example was equivalent to a yield of 19.7 grams of polymer per gram of catalyst.

In another experiment propylene was polymerized using an Al/Ti ratio of about 1:1. In this experiment the polymerized catalyst was prepared by mixing 1.6 grams of titanium tetrachloride in 95 cc. n-heptane with 1.0 gram of aluminum triethyl in 80 cc. of n-heptane. The catalyst mixture was then diluted to 500 cc. total volume of n-heptane and heated to 70° C. for 15 minutes and then cooled to about 43° C. Purified propylene (described in Example I) was bubbled through the slurry at atmospheric pressure while the temperature was raised from 43° C. to 82° C. When no more propylene was absorbed (after about 1.5 hours) the reaction mixture was worked up as described in Example I. About 2.0 grams of solid were recovered. The catalyst efficiency in this experiment was equivalent to a yield of only about 0.8 gram of polymer per gram of catalyst.

A comparison of the two experiments in this example shows that an efficient polymerization reaction can only be carried out using Al/Ti ratios greater than about 1:1.

*Example III.—Preparation of polypropylene (Al/Ti=about 2.25:1)*

A polymerization catalyst was prepared by mixing 1.6 grams of titanium tetrachloride with 2.25 grams of aluminum triethyl in 100 cc. of n-heptane. The resultant composition was allowed to stand for 15 minutes at room temperature and was then added to 400 cc. of n-heptane. Purified propylene (described in Example I) was then passed at atmospheric pressure through the slurry of catalyst in n-heptane, the temperature rising spontaneously from about 32° C. to about 46° C. The reaction mixture was then heated to 76° C. and was quenched with 100 cc. of isopropyl alcohol when propylene absorption fell to 50 cc. per minute (after about 4.0 hours). The reaction mixture was worked up as described in Example I to yield 42.5 grams of solid polymer filtered from the reaction mixture and 55.0 grams of polymer from the reactor liquor. The catalyst efficiency in this expriment was equivalent to a yield of about 25.3 grams of polymer per gram of catalyst.

In another experiment propylene was polymerized using an Al/Ti ratio of about 3:1. In this experiment, the polymerization catalyst was prepared by mixing 1.25 grams of titanium tetrachloride in 7.8 cc. n-heptane with 2.3 grams of aluminum triethyl in 60 cc. of n-heptane. After standing for 15 minutes, the catalyst slurry was added to the polymerization reactor and diluted to 500 cc. total volume with n-heptane. Purified propylene (described in Example I) was then passed through the slurry and the temperature rose spontaneously from 26° to 39° C. during 1 hour. Heat was then supplied to the reactor and the temperature maintained at about 50° to 55° C. When the propylene absorption dropped to about 50–100 cc. per minute, the reaction mixture was quenched with 100 cc. of isopropyl alcohol and worked up as described in Example I to yield 56.5 grams of total polymer. The catalyst efficiency in this experiment was equivalent to a yield of about 15.7 grams of polymer per gram of catalyst.

*Example IV.—Preparation of polypropylene (Al/Ti=about 2:1)*

The polymerization catalyst was prepared by mixing 1.6 grams of titanium tetrachloride in 10 cc. of n-heptane with 2.0 grams of aluminum triethyl in 70 cc. of n-heptane at 25° C. After standing for 15 minutes, the catalyst slurry was added to the polymerization reactor and diluted to 500 cc. total volume with n-heptane. Propylene (described in Example I) was passed through the slurry and the temperature rose spontaneously from 25° to 52° C. during 1 hour. Heat was then supplied to the reactor and the temperature maintained at 50° to 55° C. When the propylene absorption dropped to 50–100 cc. per minute, the reaction mixture was quenched with 100 cc. of isopropyl alcohol. The reaction mixture was worked up as described in Example I to yield 128 grams of essentially crystalline material and 96 grams of essentially amorphous material. The catalyst efficiency in this example was equivalent to a yield of about 62.2 grams of polymer per gram of catalyst.

The experimental data of Examples I to IV are presented in graphical form in the attached drawing wherein the molar ratio of aluminum to titanium (Al/Ti) in the catalyst is plotted against the catalyst efficiency (grams of polymer product per gram of catalyst). This drawing illustrates clearly the criticality of the Al/Ti ratio in obtaining high catalyst efficiencies.

What is claimed is:

1. A method for preparing polypropylene which comprises polymerizing propylene which is essentially free of catalyst poisons at a temperature of about 50° to 100° C. and at about atmospheric pressure in the presence of a catalyst obtained by mixing aluminum triethyl with titanium tetrachloride, the mol ratio of aluminum to titanium in the catalyst being in the range of about 1.75:1 to 2.25:1, said polymerization being carried out in the presence of an essentially inert liquid diluent.

2. Method according to claim 1 wherein the catalyst is prepared by mixing the catalyst components at about room temperature for about 0.1 to 1.0 hour in an inert liquid diluent.

3. Method according to claim 1 wherein the mol ratio of aluminum to titanium is about 2:1.

4. Method according to claim 1 wherein the concentration of polypropylene at the end of the polymerization is about 5 to 30 weight percent of the total reaction mixture.

5. Method according to claim 1 wherein the polypropylene has an intrinsic viscosity in the range of about 0.2 to 6.0.

6. Method according to claim 1 wherein the catalyst concentration is about 0.1 to 0.5% by weight, based on inert diluent.

7. Method according to claim 1 wherein said polymerization is carried out for 0.5 to 10 hours.

8. Method according to claim 1 wherein the aluminum triethyl is added incrementally during the polymerization.

9. Method according to claim 8 wherein the initial Al/Ti mol ratio is at least about 1:1.

10. Method according to claim 1 wherein the catalyst and the inert liquid diluent are initially heated to a temperature of about 50° to 100° C. and then the propylene is introduced thereto.

References Cited in the file of this patent

UNITED STATES PATENTS 2,721,189    Anderson _____ Oct. 18, 1955

FOREIGN PATENTS 533,362    Belgium _____ May 15, 1955

OTHER REFERENCES

J. Am. Chm. Soc., "Communication by Natta et al.," volume 77, March 20, 1955, pages 1708–1710.

Chem. and Eng. News, volume 33, July 11, 1955, page 2910.

Notice of Adverse Decision in Interference

In Interference No. 92,379, involving Patent No. 2,874,153, L. W. Bowman and R. F. Leary, Polymerization of propylene, final judgment adverse to the patentees was rendered June 12, 1962, as to claim 6.
[*Official Gazette July 10, 1962.*]